United States Patent [19]

Maeda et al.

[11] Patent Number: 4,805,119
[45] Date of Patent: Feb. 14, 1989

[54] USER TERMINAL FOR VIDEOTEX

[75] Inventors: Satoru Maeda; Shigeru Yatou, both of Kanagawa, Japan

[73] Assignee: Sony Corporation, Japan

[21] Appl. No.: 879,004

[22] Filed: Jun. 26, 1986

[30] Foreign Application Priority Data

Jun. 27, 1985 [JP] Japan .................................. 60-140919

[51] Int. Cl.$^4$ ...................... G06F 15/64; H04M 11/08
[52] U.S. Cl. ......................................... 364/518; 379/96
[58] Field of Search .................. 364/518, 523; 379/96, 379/93, 97, 98, 84, 89, 100

[56] References Cited

U.S. PATENT DOCUMENTS

| | | | |
|---|---|---|---|
| 4,258,426 | 3/1981 | Balzarini et al. ..................... | 364/518 |
| 4,533,943 | 8/1985 | Poirier .................................... | 358/85 |
| 4,578,535 | 3/1986 | Simmons .............................. | 379/100 |
| 4,581,484 | 4/1986 | Bendig .................................. | 379/96 |
| 4,585,908 | 4/1986 | Smith .................................... | 379/96 |
| 4,600,808 | 7/1986 | Cosentino et al. ................... | 379/96 |
| 4,636,858 | 1/1987 | Hague et al. ......................... | 358/147 |
| 4,653,086 | 3/1987 | Laube .................................... | 379/96 |
| 4,659,876 | 4/1987 | Sullivan et al. ...................... | 379/96 |
| 4,677,659 | 6/1987 | Dargan .................................. | 379/97 |
| 4,691,340 | 9/1987 | Maeda et al. ......................... | 379/96 |

Primary Examiner—Gary V. Harkcom
Assistant Examiner—Randy W. Lacasse
Attorney, Agent, or Firm—Limbach, Limbach & Sutton

[57] ABSTRACT

A method and apparatus for retrieving picture information stored in an information center and subsequently storing the picture information in a user terminal by registering in the information center retrieval control information having picture numbers used in the retrieving operation, requesting the retrieval control information from the information center through a communication line, receiving and storing the retrieval control information in the user terminal, analyzing the retrieval control information and extracting the picture numbers contained in the retrieval control information, transmitting the picture numbers to the information center through the communication line to request the picture information corresponding to the picture numbers, and receiving and storing the picture information in the user terminal, wherein the picture retrieval operations can be achieved in an off-line mode by using the stored picture information and the stored retrieval control information received during an on-line mode.

5 Claims, 5 Drawing Sheets

USER TERMINAL FOR VIDEOTEX

BACKGROUND OF THE INVENTION

1. Field of the Invention

The present invention relates generally to a user terminal for a videotex system and, more particularly, is directed to a user terminal capable of displaying picture information in an off-line mode.

2. Description of the Prior Art

Recently, in Japan, a videotex system, which is referred to as CAPTAIN (character and pattern telephone access information network) system, has been started which offers commercially available service. The CAPTAIN system has such significant features as the ability to use an existing telephone network line as a transmission line and to use a home television receiver as a display apparatus for displaying character and figure or pattern information sent over the telephone line. Since this videotex system carries out a conversational (i.e. interactive) type communication, it has a wide field of application.

In order for a user to retrieve the requested information, the user has to operate a keyboard to access a menu picture stored at the center computer and, while checking the menu picture, the user has to repeat a number of keyboard operations. The more frequently the keys are operated, the more frequently mistakes occur in the key operation. This causes unnecessary information to be retrieved and requires an error correction operation, etc. Large losses from a time and economical standpoint can result. The above mentioned problems become more serious when a picture of restricted range is repeatedly utilized, as in a sales promotion and in education. In addition, since the transmission bit rate is relatively low, it takes a lot of time for the user to reach the desired information. During this long retrieval operation period, the user terminal and the center computer are connected through a telephone network line, requiring a large communication charge. For example, when the user does a study program by utilizing educational information accumulated in the CAPTAIN system, the user reaches the first question picture in accordance with the afore-mentioned procedures. Then, the user operates the keys to choose the selection branch that the user thinks is correct. If it is the correct answer, the next question picture is displayed on the receiver. If on the other hand the selection branch is not the correct answer, the fact that the answer is not correct is displayed on the next picture and the user comes back to the preceding picture. Then, the user selects the correct answer branch. Through similar operations, the user reaches the final question picture. In this case, the time required by the user to answer the problem is also included in the communication time so that the communication charge amounts to a large sum.

In the case of a sales promotion, various kinds of sales promotion information concerning consumer goods (catalog goods) such as expensive goods and made-to-order goods that a general retail shop can not always store as stock are conventionally distributed in the form of a printed article from a manufacturer to respective retail shops, including the market prices that are changed freely. This inefficient distribution of information can be avoided by furnishing it electronically as a picture of the CAPTAIN system. Using the CAPTAIN system, the retail shop can freely obtain the latest sales promotion information for various kinds of catalog goods without loss and trouble.

In the sale of catalog goods, a medium, for example an optical video disc, on which a picture of the catalog goods is recorded, is distributed to the retail shops. In a retail shop, the business talk goes on with customers who are seeing the picture reproduced from the video disc. In order to synchronize the up-to-date sales promotion information concerning the particular goods, which information is supplied over the telephone line from the CAPTAIN system, with the reproduced picture from the user terminal's video disc corresponding to the same goods, it is necessary that control information to control the video disc reproducing apparatus (or any other peripheral apparatus) be simultaneously sent to the user terminal as tele-soft information. This enables the latest sales promotion information of various kinds of catalog goods to be freely reproduced together with the catalog information stored on the video disc and effectively utilized for the sales activities of the retail shop.

However, when the sales promotion information according to the above mentioned CAPTAIN system is utilized, it takes a lot of time to reach a desired picture and also there is a high probability that misoperation will occur. The sales promotion information concerning the same catalog goods is reproduced each time when the business talk is made with different customers. Moreover, the greater the number of customers, the more serious the time and communication charge problems become.

A fundamental problem in all of these examples is that the tree information for controlling the retrieval of the desired picture is stored in the memory of the center computer and is not transmitted to the user terminal. The succeeding picture information to guide the user is also stored in the memory of the center computer and is not sent to the user terminal. That is, the user terminal can receive only the picture information to be displayed on a screen of the television receiver and not the menus program itself.

OBJECTS AND SUMMARY OF THE INVENTION

In accordance with one aspect of the present invention, there is provided a user terminal for a videotex system which includes means for requesting retrieval control information containing the picture numbers of picture information required for the retrieval operation, analyzing means for analyzing and extracting the picture numbers from the retrieval control information, transmitting means for transmitting the picture numbers to the information center to request the picture information corresponding to the picture numbers, and receiving means for receiving and storing the transmitted picture information. Then, the retrieval operation can be achieved in an off-line mode by using the stored picture information and the retrieval control information.

Accordingly, it is an object of the present invention to provide a user terminal for a videotex system in which a user can reach a desired information picture in a short time period easily and accurately.

Another object of the present invention is to provide a user terminal for a videotex system in which the peripheral apparatus, such as a video disc reproducing apparatus can be automatically controlled.

It is yet another object of the present invention to provide a user terminal for a videotex system in which a retrieval operation can be achieved in an offline mode by using stored picture information and retrieval control information which have been supplied over the videotex system during on-line operation.

A further object of the present invention is to provide a user terminal for a videotex system in which the probability of the misoperation of the keyboard is minimized.

These and other objects, features and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENT

First, the outline of the CAPTAIN system will be described with reference to FIGS. 1 to 3.

Figure 1:
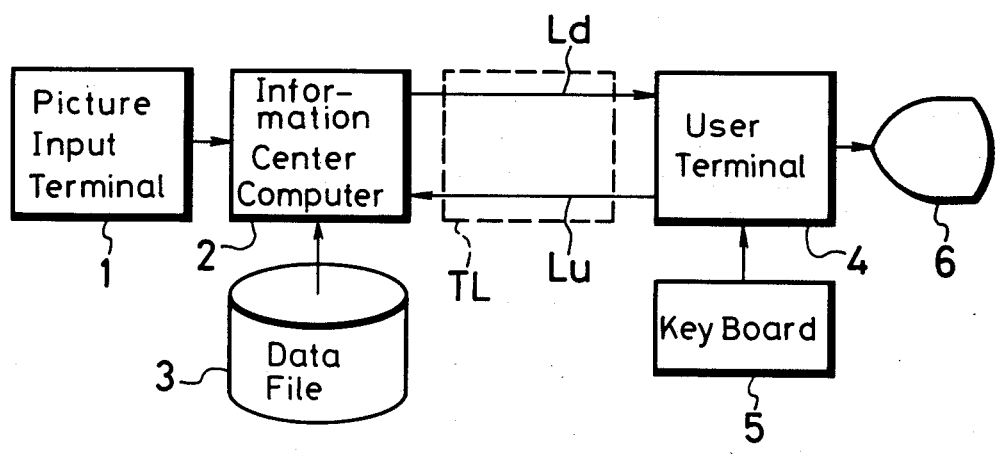
FIG. 1 is a block diagram showing an arrangement of a prior art videotex system.

As shown in FIG. 1, the CAPTAIN system fundamentally comprises an information center represented mainly by a picture input terminal 1, an information center computer 2 and a data file 3, a user terminal 4 and a telephone network line TL as a transmission line. Character and figure information provided by many information suppliers are transmitted from the picture input terminal 1 in the information center to the center computer 2 and then stored in the data file 3 which uses a magnetic disc apparatus having a large capacity. A user operates the user terminal 4 by using a keyboard 5 to access desired information in the center computer 2 via an up-link Lu of the telephone network line TL. The information retrieved from the data file 3 by the center computer 2 in response to this accessing or command is transmitted via a down-link Ld of the telephone network line TL at a transmission rate of 4800 bits/second to the user terminal 4. The user terminal 4 incorporates therein a central processing unit (CPU) and a frame memory (both of which are not shown). The CPU analyzes the picture information transmitted and writes picture data into the frame memory. The state of this frame memory is displayed on a television receiver or a special receiver (hereinafter referred to simply as a receiver in the explanation below) 6.

In order to display one picture on the receiver 6 from the information furnished, control information to control the whole picture, such as a background color, and display information indicating whether the display is text, photographic, or the like, are required. The amount of information required for one picture is, for example, about 16K bytes.

On the header section of the picture, there are displayed the character information, such as the name of an information supplier, a picture number and the like. Further, there is tele-soft information, which is used to supply software data to the user terminal 4. In the tele-soft information, instead of the control information and display information of the normal picture, information software data is transmitted from information suppliers to be stored in the information center in a manner similar to the picture information. This tele-soft information can be received by any kind of user terminal if the user terminal is equipped with optional processing apparatus for processing this tele-soft information.

The CAPTAIN data service system is capable of supplying various kinds of information, for example, current information such as news, weather forecast and the like, accumulated information such as daily life information and the like, and restricted information, such as business information and the like, etc. In this case, in order that the user may easily and quickly get the desired information, there is employed a retrieval scheme based on an information classification system having a tree structure. In this retrieval scheme, all information is sub-divided in accordance with classification items of four stages and each item of information is given a classified number of four figures. As a minimum retrieval unit, there is employed a page which is formed of 10 pictures at a maximum. Each page is given a page number of 8 figures and each picture is given a picture number of 9 figures. The higher 4 figures of the page number or the picture number indicate the number or code of the information supplier.

The construction of the picture number is as follows.

X1 X2 X3 X4 X5 X6 X7 X8 X9

X1 to X4 are the number or code of the information supplier

Figure 2:
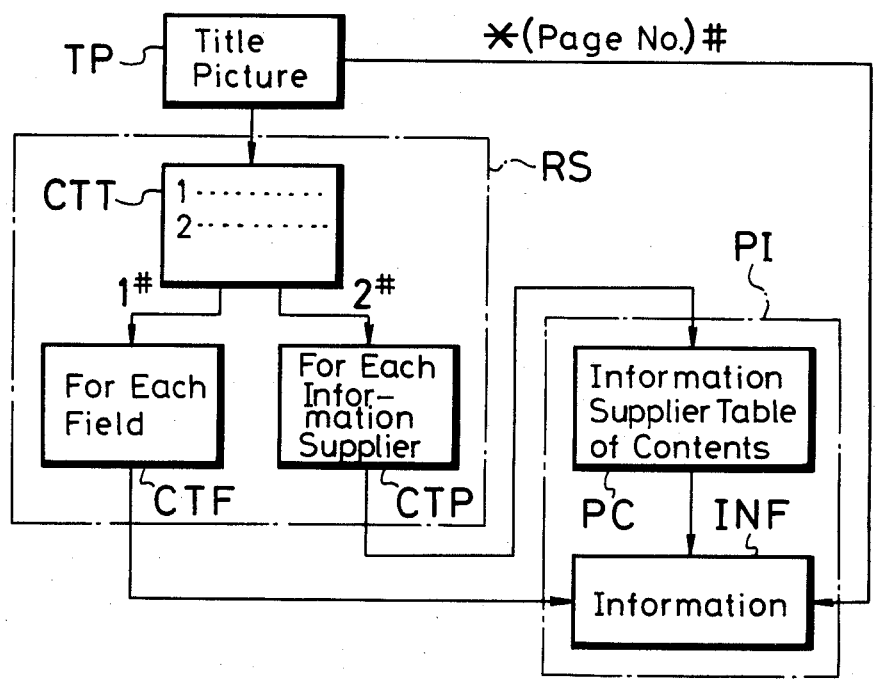
FIGS. 2 and 3 are conceptual diagrams used to explain the operation of the prior art system.

The user is given two procedures for retrieving necessary information as shown in FIG. 2.

(i) To use a contents picture

In accordance with a higher stage content picture CTT classified separately into information fields and the like, a content picture CTF available for each field or a content picture CTP available for each information supplier is sequentially retrieved from a title picture TP. Further, in accordance with an information supplier table of contents PC and contained in information PI from the information supplier, the user can reach the information INF.

(ii) To access directly

When the page number of the necessary information INF is known from an information number register and so on, it is possible for the user to reach the necessary picture by immediately accessing the corresponding picture number. Such retrieval is executed when the user operates the keyboard 5 to transmit a command to the center computer 2.

The keyboard 5 has various function keys that are indicated on the table below.

| Kinds of Keys | Functions |
|---|---|
| Numeral keys (0 to 9) | The keys are used to directly access a page and also to select items displayed on a screen. |
| * key | This key is used to directly access a page and also to issue some special instruction. |
| # key | This key is used to access a page number and also to select the |

| Kinds of Keys | Functions |
| --- | --- |
| | -continued |
| | items on the screen. |
| Return key | This key is used to look at a preceding picture again. By this key, the user can look three pages back successively. |
| Stop key | This key is used to break the connection of a user terminal apparatus with a center while the picture is still displayed. |

Figure 3:
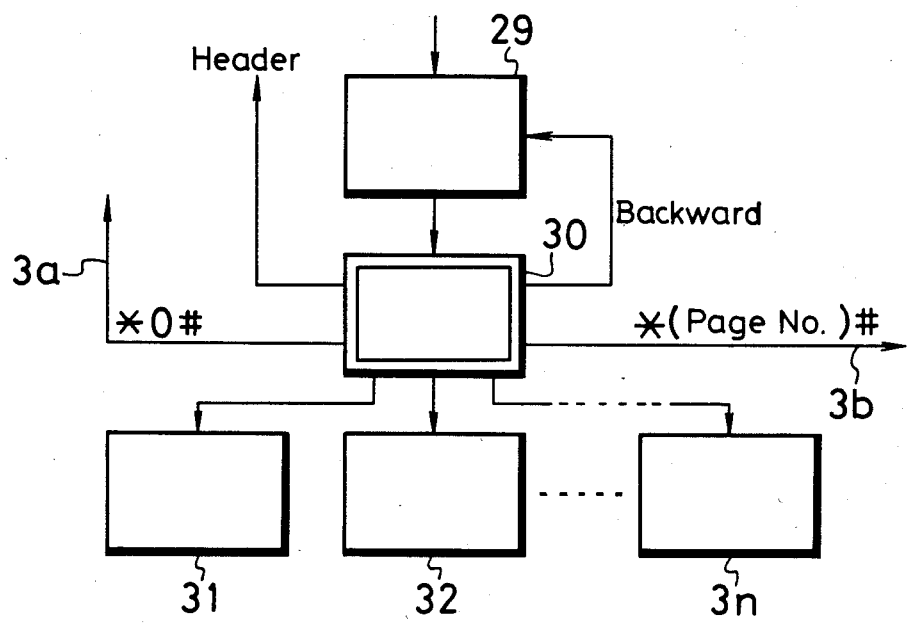

It is possible to select the next picture in sequence from a given picture by operating these keys as shown in FIG. 3. Referring to FIG. 3, when a picture 30 is displayed, if a command "*0#" as shown by an arrow 3a is issued form the keyboard 5, the picture of the whole contents is selected, while if a command "* (page number)#" as shown by an arrow 3b is issued rom the keyboard 5, the page of that page number is elected directly. Further, if the displayed picture 30 contains the selection numbers therein, and one of the numbers is selected and inputted by the keyboard 5, such number is transmitted to the center and the center analyzes the transmitted number with reference to the next picture information of the picture 30, and the required picture information corresponding to the selected number is transmitted and displayed on the screen like 31, 32, . . . 3n.

Next, an embodiment of a user terminal for a videotex system according to the present invention will hereinafter be described with reference to FIGS. 1 to 8.

Figure 4:
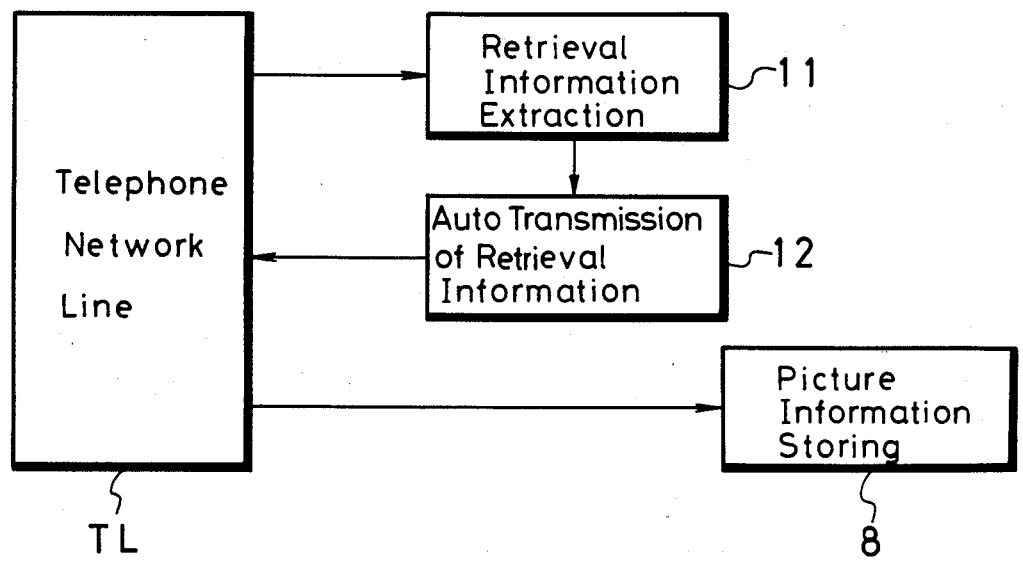
FIG. 4 is a function block diagram showing one embodiment of a user terminal apparatus for a videotex system according to this invention.
Figure 5:
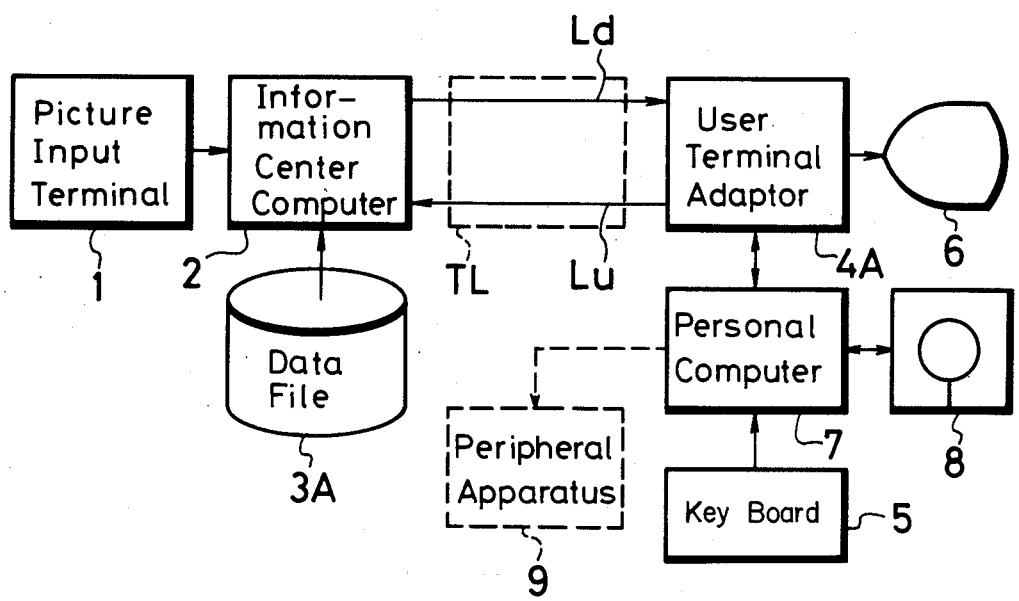
FIG. 5 is a block diagram of a videotex system to which the present invention is applied.

FIG. 4 shows a function block diagram of one embodiment of the present invention, and FIG. 5 shows an arrangement of a CAPTAIN system to which the present invention is applied. In FIG. 5, like parts corresponding to those of FIG. 1 are marked with the same references and the overlapping explanation will be omitted.

In FIG. 5, reference numeral 4A designates a user terminal adaptor to which the receiver 6 and a personal computer 7 are connected. The personal computer 7 is capable of the functions of the CPU and the frame memory incorporated in the user terminal 4 shown in FIG. 1. This personal computer 7 is connected with the keyboard 5 and a storage apparatus, for example, a floppy disc drive (hereinafter simply referred to as an FD apparatus) 8. To this personal computer 7, a relating peripheral apparatus 9 like the afore-mentioned video disc reproducing apparatus may be connected. Further, the personal computer 7 and the user terminal adaptor 4A may be formed into a unitary body.

In the information center, there are registered together the specific information, such as the afore-mentioned sales promotion information, and the retrieval control information, such as the tele-soft information which is used to retrieve this specific information. The specific information and the retrieval control information are accumulated in the data file 3A. Included in the retrieval control information, there is picture retrieval information (picture number of specific information to be retrieved), continuation method information (information such as continuation selection code and the like), selection information concerning the branching, and information concerning the attribute of a picture, and so on.

Figure 6:
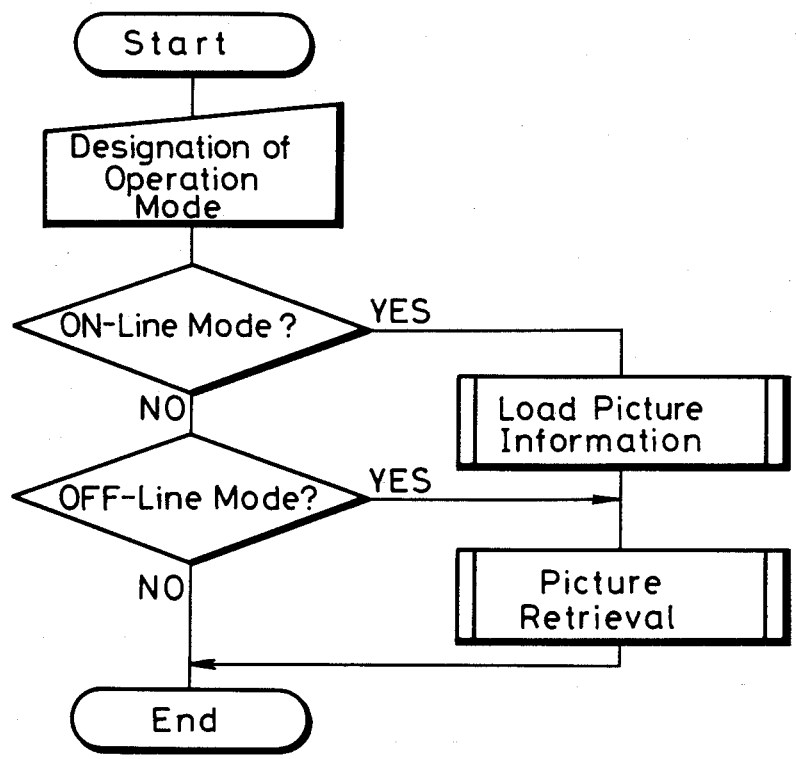
FIGS. 6, 7, and 8 are flow charts used to explain the operation of one embodiment of this invention.
Figure 7:
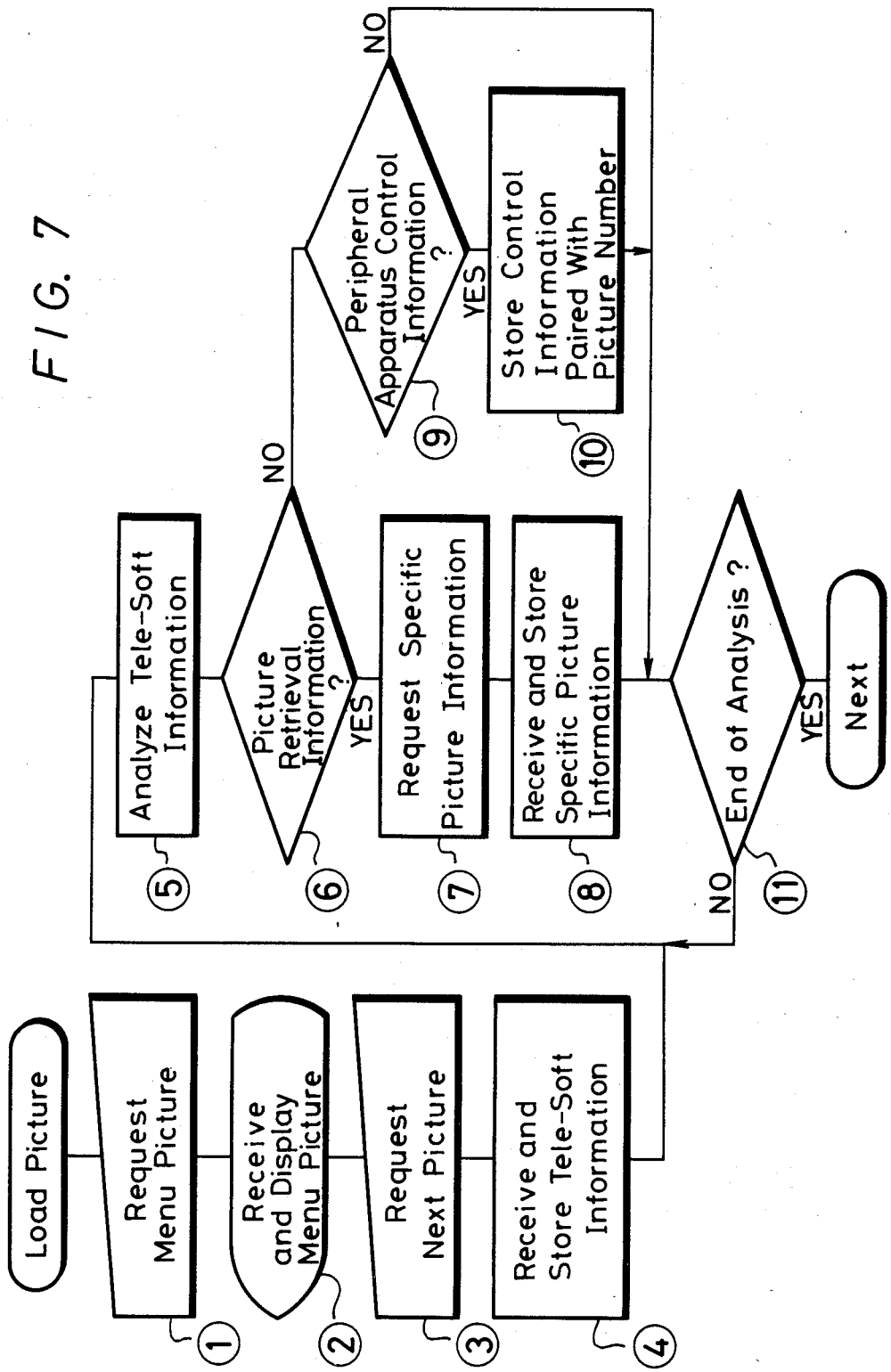

The operation of this embodiment will now be described. As shown in FIG. 6, according to this embodiment, the picture information is loaded in the on-line mode, while the loaded picture information is retrieved in the off-line mode. When the picture information is loaded onto the FD apparatus 8, as shown in FIG. 7, the user operates the keyboard 5 as in "*CNTL#" to request the information center computer 2 to provide the menu picture (corresponding to the CCT in FIG. 2) of the above mentioned retrieval control information (at step 1). When the menu picture is received and then displayed on the receiver 6 (at step 2), the next picture is requested and the requested information is retrieved in accordance with the next picture information on the menu picture in the information center (at step 3). In response to this request, the tele-soft information (retrieval control information containing the picture numbers) transmitted from the information center is stored in the memory of the personal computer 7 (at step 4). Each command of the tele-soft information is analyzed by the retrieval information extracting function of the personal computer 7 to thereby extract the picture number to retrieve the specific information (at steps 5 and 6).

In accordance with the picture numbers thus extracted, the personal computer 7 automatically transmits a series of picture numbers to the information center through the user terminal adaptor 4A and makes a series of requests of specific picture information (at step 7). In response to such requests, the specific picture information transmitted from the information center is stored in the FD apparatus 8 (at step 8) along with the retrieval control information with the picture number. Further, when the control information of the peripheral apparatus 9, such as the previously mentioned video disc reproducing apparatus is included in the tele-soft information, such control information is paired with the picture number to be synchronized and this peripheral apparatus control information is also stored in the FD apparatus 8 (at steps 9 and 10).

Alternatively, it is possible to preprogram the personal computer 7 for retrieving the retrieval control information together with the picture numbers of the required picture information.

Figure 8:
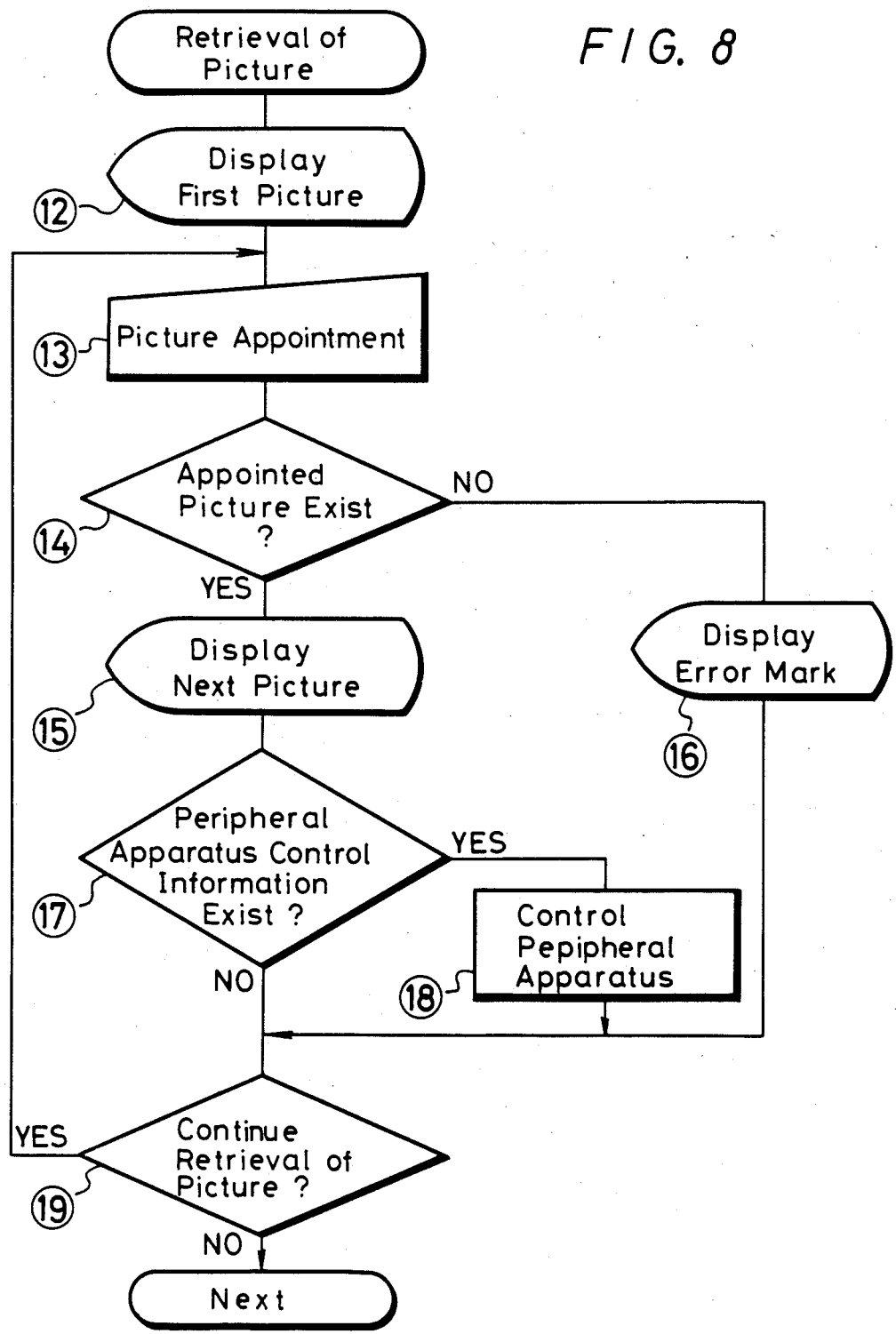

A series of specific pictures stored in the FD apparatus 8 as mentioned above are displayed in a specific order defined by the retrieval control information on the receiver 6 in accordance with the procedure shown in FIG. 8. Firstly, the menu picture, or the like, indicative of the retrieval route is displayed on the screen as the first picture (at step 12). Then, the user operates the keyboard 5 and a picture that will be displayed next is defined or appointed in accordance with the next picture information (in the retrieval control information) (at step 13). When the picture is appointed, the picture information stored in the FD apparatus 8 is read out and a desired picture is displayed on the receiver 6 (at steps 14 and 15). When a picture corresponding to the appointed picture is not presented due to misoperation of the keyboard 5, an error mark is displayed on the receiver 6 (at step 16).

When the peripheral apparatus control information is stored in the FD apparatus 8, this control information is read out, whereby the peripheral apparatus 9, for example, the video disc reproducing apparatus is controlled so as to reproduce a video disc picture corresponding to the information displayed on the screen of the user terminal (at steps 17 and 18).

According to this embodiment, the retrieval control information, which is registered beforehand in the information center, is stored in the storage apparatus at the side of the user terminal. The specific picture information is derived from the information center on the basis of this retrieval control information and then stored in the user terminal storage apparatus. Thereafter the picture information stored in this storage apparatus is read out and then displayed on the receiver. When the user utilizes the specific picture information, the previously troublesome procedure which required the user terminal to be connected to the information center becomes unnecessary, with a consequent savings in time and expense. Therefore, it becomes possible for the user to reach the desired specific picture easily and positively. Consider the situation when the picture concerning the specific picture information is freely changed, such as in the case of the sales prices of catalog goods. If independently of the tree diagram structure picture classification system mentioned above, the information supplier prepares retrieval control information that can be immediately accessed for this specific picture, it becomes easy to change only the specific picture and also becomes easy to change the contents stored in the storage apparatus of the user terminal side.

According to the present invention as described above in detail, since the specific picture information of the information center and the retrieval control information thereof are stored in the storage apparatus at the site of the user terminal and this stored specific picture information is retrieved in the off-line mode, it becomes possible to provide a user terminal apparatus for a videotex system in which the user can reach the desired specific picture information easily and positively and which can greatly reduce the retrieval time and communication charges.

The above description is given on a single preferred embodiment of the invention but it will be apparent that many modifications and variations could be effected by one skilled in the art without departing from the spirits or scope of the novel concepts of the invention so that the scope of the invention should be determined by the appended claim only.

We claim as our invention:

1. A method for retrieving picture information stored in an information center and subsequently storing the picture information in storing means in a user terminal comprising the steps of:

registering in sad information center retrieval control information including image information and picture numbers used in the retrieving operation;

requesting the retrieval control information from said information center through a communication line;

receiving and storing said retrieval control information in the user terminal;

analyzing said retrieval control information and extracting the picture numbers contained in said retrieval control information;

transmitting said picture numbers to the information center through said communication line to request the picture information corresponding to said picture numbers; and receiving and storing said picture information, including image information corresponding to the picture numbers in said storing means; and using the stored picture information and the stored retrieval control information which were obtained in the on-line mode, retrieving selected image information from the storing means in an off-line mode.

2. A method of retrieving from an information center image information and retrieval control information including picture numbers, corresponding to the image information and which are used in the retrieving operation, and subsequently storing the image information and retrieval control information in a user terminal comprising the steps of:

receiving and storing said retrieval control information in the user terminal;

analyzing said retrieval control information and extracting the picture numbers contained in said retrieval control information;

transmitting said picture numbers to the information center through said communication line to request the image information corresponding to said picture numbers;

receiving and storing said image information in said strong means and using the stored image information and the stored retreieval mode to carry out picture retrieval operations.

3. A user terminal for use with a videotex system, the user terminal comprising means for requesting from an information center retrieval control information containing picture numbers of certain picture information required for information retrieval operations at the user terminal, analyzing means for analyzing and extracting the picture numbers from the retrieval control information, transmitting means for transmitting the picture numbers to the information center to request the picture information corresponding to the picture numbers, receiving means for receiving and storing the picture information transmitted from the information center; and means for using said storage picture information and said stored reterieval control information at the user terminal in an off-line mode to carry out picture retrieval operations.

4. A user terminal for use with a videotex system of the type having a center for storing picture information of the type having image information and picture numbers corresponding to separate images represented by the image information and retrieval control information which includes the picture numbers of the picture information, the user terminal comprising means for requesting retrieval control information from the videotex system containing certain picture numbers, analyzing means for analyzing and extracting the picture numbers from said retrieval control information, transmitting means for transmitting the picture numbers to the information center to request the picture information corresponding to the picture numbers, receiving means for receiving and storing the picture information transmitted from the information center; and means for using said stored picture information and said stored reterieval control information at the user terminal in an off-line mode to carry out picture retrieval operations.

5. A videotex user terminal as recited in claim 4 wherein the user terminal further comprises peripheral equipment for storing picture information, means for requesting peripheral equipment control information from the information center, and means for pairing such peripheral equipment control information with predetermined picture numbers to syncrhonize the operation of such peripheral equipment with the retrieval of stored picture information from the peripheral equipment.

* * * * *